United States Patent [19]
Marshall

[11] Patent Number: 6,109,078
[45] Date of Patent: Aug. 29, 2000

[54] TRAILER AND JACK STAND LOCK ASSEMBLY

[75] Inventor: Robert L. Marshall, Salem, Ky.

[73] Assignee: Bob Marshall Enterprises, Inc., Salem, Ky.

[21] Appl. No.: 09/235,441

[22] Filed: Jan. 22, 1999

[51] Int. Cl.[7] .............................. F16B 41/00; B16D 1/01
[52] U.S. Cl. .................................. 70/232; 70/14; 70/258; 70/237; 70/238; 280/507; 248/552
[58] Field of Search .............................. 70/232, 238, 258, 70/14, 237; 248/352, 551, 552; 280/507, 511

[56] References Cited

U.S. PATENT DOCUMENTS

| | | | |
|---|---|---|---|
| 2,716,336 | 8/1955 | Ross | 70/238 |
| 3,435,646 | 4/1969 | Michnoff | 70/238 |
| 3,711,117 | 1/1973 | Penner et al. | 70/226 |
| 3,990,280 | 11/1976 | Jahn | 70/238 |
| 4,688,408 | 8/1987 | Shroyer | 70/232 |
| 4,774,823 | 10/1988 | Callisom | 70/232 |
| 4,779,435 | 10/1988 | Farrow | 70/238 |
| 4,794,769 | 1/1989 | Persons | 70/232 |
| 4,819,461 | 4/1989 | Pearson | 70/238 |
| 5,197,311 | 3/1993 | Clark | 70/232 |
| 5,259,223 | 11/1993 | Nee | 70/232 |
| 5,520,030 | 5/1996 | Muldoon | 70/232 |
| 5,743,548 | 4/1998 | Gaspard | 70/232 |

FOREIGN PATENT DOCUMENTS 2238519  6/1991  United Kingdom ..................... 70/238

Primary Examiner—Darnell Boucher
Attorney, Agent, or Firm—Carrithers Law Office; David W. Carrithers

[57] ABSTRACT

A gooseneck trailer jack stand locking assembly having an extendable longitudinal locking brace extending from the gooseneck trailer coupling post hitch ball to the drop leg of the leveling jack of the trailer or alternatively to a plate attached to the underside of the trailer preventing positioning or hitching of a vehicle thereto and including a lock to prevent removal of the brace.

20 Claims, 3 Drawing Sheets

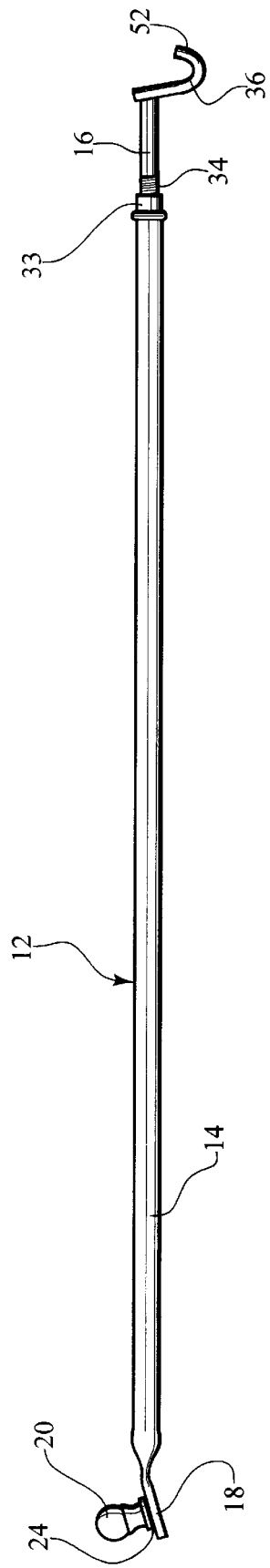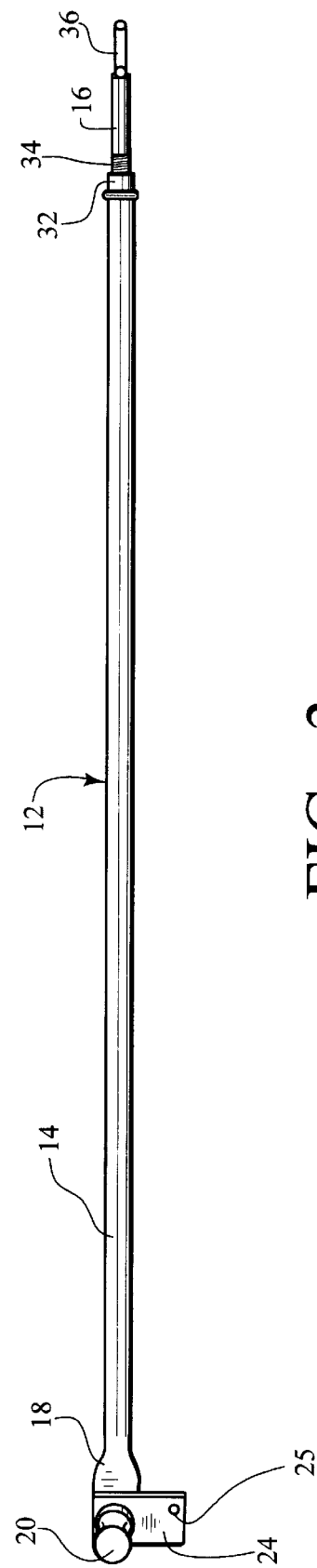
FIG. 2
FIG. 3

TRAILER AND JACK STAND LOCK ASSEMBLY

BACKGROUND OF THE INVENTION

1. Field of the Invention

This invention relates generally to prevention of unauthorized use or theft of a gooseneck trailer.

Gooseneck trailers have been designed for coupling to a fifth wheel attachment of a truck frame or pickup truck bed whereby a coupling post extends downward from the trailer frame providing rotational support for pulling the trailer. More particularly, a gooseneck trailer includes a horizontal frame extending forward from the upper limit of the trailer terminating at its forward end in a depending vertical member defining a coupling post in cooperative engagement with a fifth wheel assembly centrally mounted on the bed of a pickup truck or tractor. The length of the length of the horizontal frame provides sufficient space between the towing vehicle for pivoting movement of the towing vehicle relative to the trailer.

Upon parking the trailer, the trailer is elevated upon a jack stand and the truck or tractor towing vehicle is pulled from underneath of the trailer frame and separated therefrom. While the trailer is parked and separated from the towing vehicle, the trailer is susceptible to theft by another towing vehicle having a fifth wheel hitch attachment. The unattended coupling post of the trailer gooseneck provides a ready means for quick coupling and removal of the trailer.

2. Description of the Prior Art

Conventional prior art devices have been directed toward locking devices for gooseneck trailer hitch posts and more particularly to the actual trailer hitch mechanism. Telescoping members are known which connect the coupling post of a gooseneck trailer to the jack stand; however, these members may be removed with conventional tools within minutes. Thus, many prior art designs do not prevent or hinder the removal of the entire trailer hitch assembly which is only held in place by jam nuts, wherein the locked trailer hitch assembly can be removed and replaced with a serviceable assembly in a matter of minutes. Moreover, prior art designs have not prevented towing vehicle from being backed into proper towing position where a locked hitch could be lowered onto a temporary receptacle, such as a ("spare tire and wheel placed over the towing vehicles' hitch ball"), in order to tow the trailer to a new location where the lock could be removed or the locked trailer hitch assembly could be replaced, and the trailer then hitched to the towing vehicle in a normal manner.

SUMMARY OF THE INVENTION

The present invention provides a locking assembly for a gooseneck trailer having a trailer hitch ball receiving coupling post and at least one trailer support leveling jack.

The gooseneck trailer jack stand locking assembly has an extendable longitudinal locking brace including a first and second longitudinal member. The distal end of the first longitudinal member includes a hitch ball and a steel plate having a hole therein for alignment with a hole formed in the gooseneck trailer coupling post for cooperative engagement with a padlock defining a shackle and lock body inserted therethrough. The opposing distal end of the first longitudinal member includes an axial threaded bore. The second longitudinal member includes an axial threaded shaft for threaded engagement with the axial threaded bore of the first longitudinal member. The opposite distal end of the second longitudinal member includes a hook for cooperative engagement with a hole formed in the drop leg of the leveling jack of the trailer or alternatively with a hole formed in a plate attached to the underside of the trailer. Rotation of the first longitudinal member with respect to the second longitudinal member extends the length of the longitudinal locking brace. Upon extending the longitudinal locking brace to its maximum length and alignment of the hole in the plate of the first longitudinal member with the hole formed in the coupling post, insertion of a padlock prevents removal of the longitudinal locking brace and prevents positioning or hitching of a vehicle thereto.

An important advantage of the present invention in view of the prior art trailer locks is the means to adjust the length of the locking brace of the jack stand locking assembly via rotation of its longitudinal members to a predetermined length which cannot be changed without removal of the padlock from the assembly.

It is an object of the present invention to prevent the trailer hitch coupling post from accepting the towing vehicle's trailer hitch ball.

It is an object of the present invention to prevent the removal of a locked trailer hitch assembly and it's replacement with a serviceable hitch assembly.

It is a further object of the present invention to prevent a towing vehicle from being positioned in under the trailer frame for attachment of the coupling post to a tow vehicle's hitch.

It is yet a further object of the present invention to prevent extension of the longitudinal brace members through telescopic movement by providing threadably engageable members.

These objects and further advantages shall be set forth in more detail as follows.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 2 is a perspective side view of the longitudinal locking brace of FIG. 1;

FIG. 3 is a perspective top view of the longitudinal locking brace of FIG. 1.

SPECIFICATION

Figure 1:
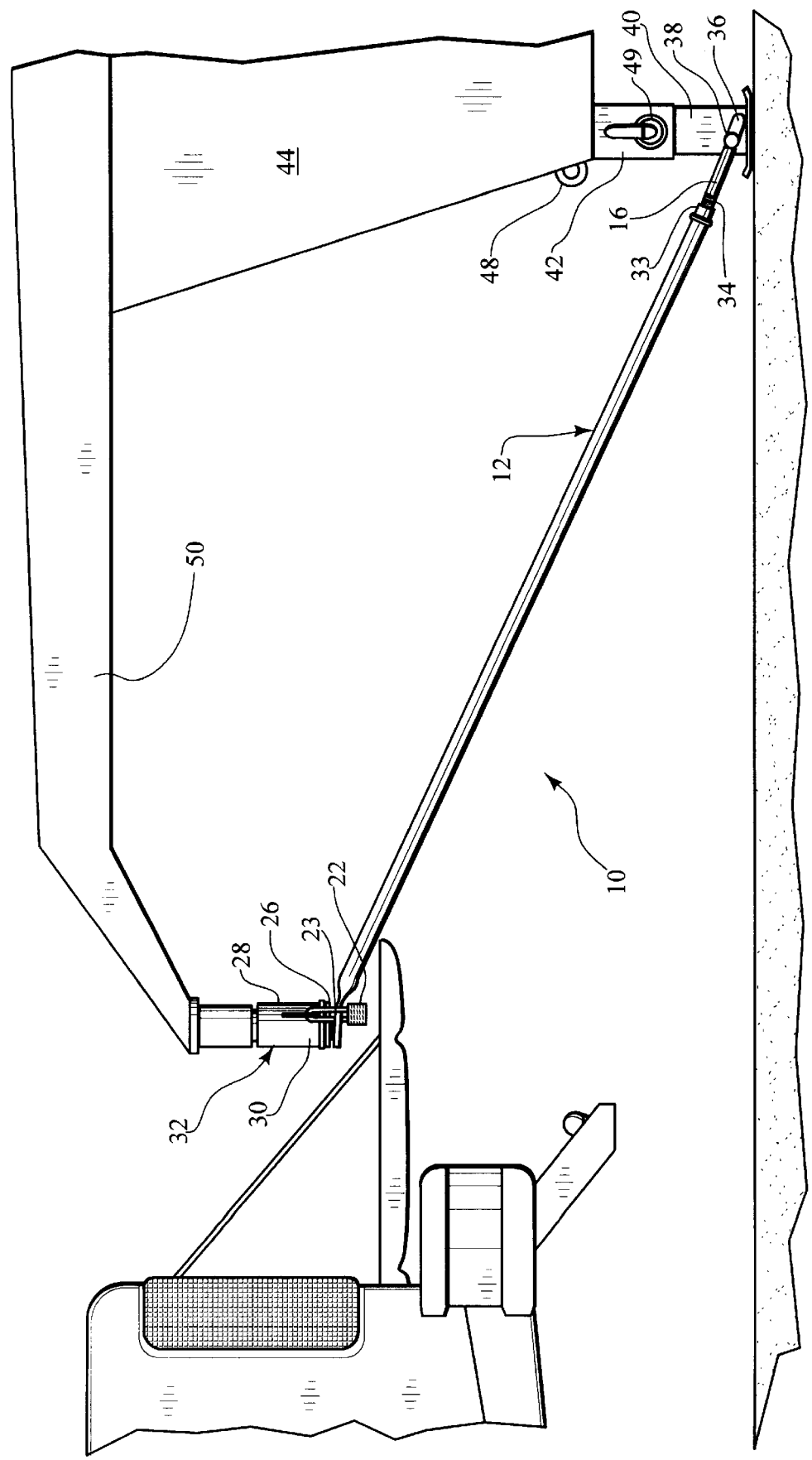
FIG. 1 is a perspective view of the present invention showing the gooseneck trailer jack stand locking assembly having an extendable longitudinal locking brace extending from the gooseneck trailer coupling post hitch ball to the drop leg of the leveling jack of the trailer preventing positioning or hitching of a vehicle thereto including a lock to prevent removal of the brace from the coupling post hitch ball.

The trailer and jack stand lock assembly 10 of the present invention is manufactured from readily available materials and simple in design. The preferred embodiment is comprised of steel, aluminum, iron, fiberglass, nylon, or synthetic graphite fiber.

More particularly, as shown in FIGS. 1–4, a gooseneck trailer jack stand locking assembly 10 includes an extendable longitudinal locking brace 12 including a first longitudinal member 14 and a second longitudinal member 16 in threaded engagement therewith.

The first longitudinal member includes a flat distal end 18 having a hole therein for cooperative engagement with the bolt of a hitch ball 20. A means of attaching a lock 22, such as a padlock, thereto, defining a flat plate 24 having a hole 25 therein for cooperative engagement with a lock loop member 26. The hole 26 is located in close proximity to the hitch ball 20 and is alignable with a means of attachment defining a hole or loop 28 formed at or near the distal end 30 of the gooseneck trailer coupling post 32 for cooperative engagement therewith. The second distal end 32 includes a threaded bore extending axially inwardly a selected distance.

A first distal end of the second longitudinal member 16 defines an axially threaded shaft 34 for threaded engagement with the axial threaded bore of the first longitudinal member 14. The opposing distal end of the second longitudinal member 16 includes a hook 36 formed integrally therewith, or welded or bolted thereto for cooperative engagement with means for attachment in close proximity to the trailer 44 frame so that a truck having a ball hitch can not be backed underneath the gooseneck 50 of the trailer 44.

The hook 36 may be formed to include a straight section extending normal from the shaft 16 and an angled section extending back toward and spaced apart from the shaft 16; formed to include a straight section extending normal from the shaft 16 and a curved section extending back toward and spaced apart from the shaft 16; or formed to define a continuous curve extending normal from the shaft 16 back toward and spaced apart from the shaft 16. The hook 36 may also include a hole 52 therein for insertion of means for locking such as the loop of a padlock to prevent authorized removal of the hook 16 from means of attachment to the trailer 44.

Figure 4:
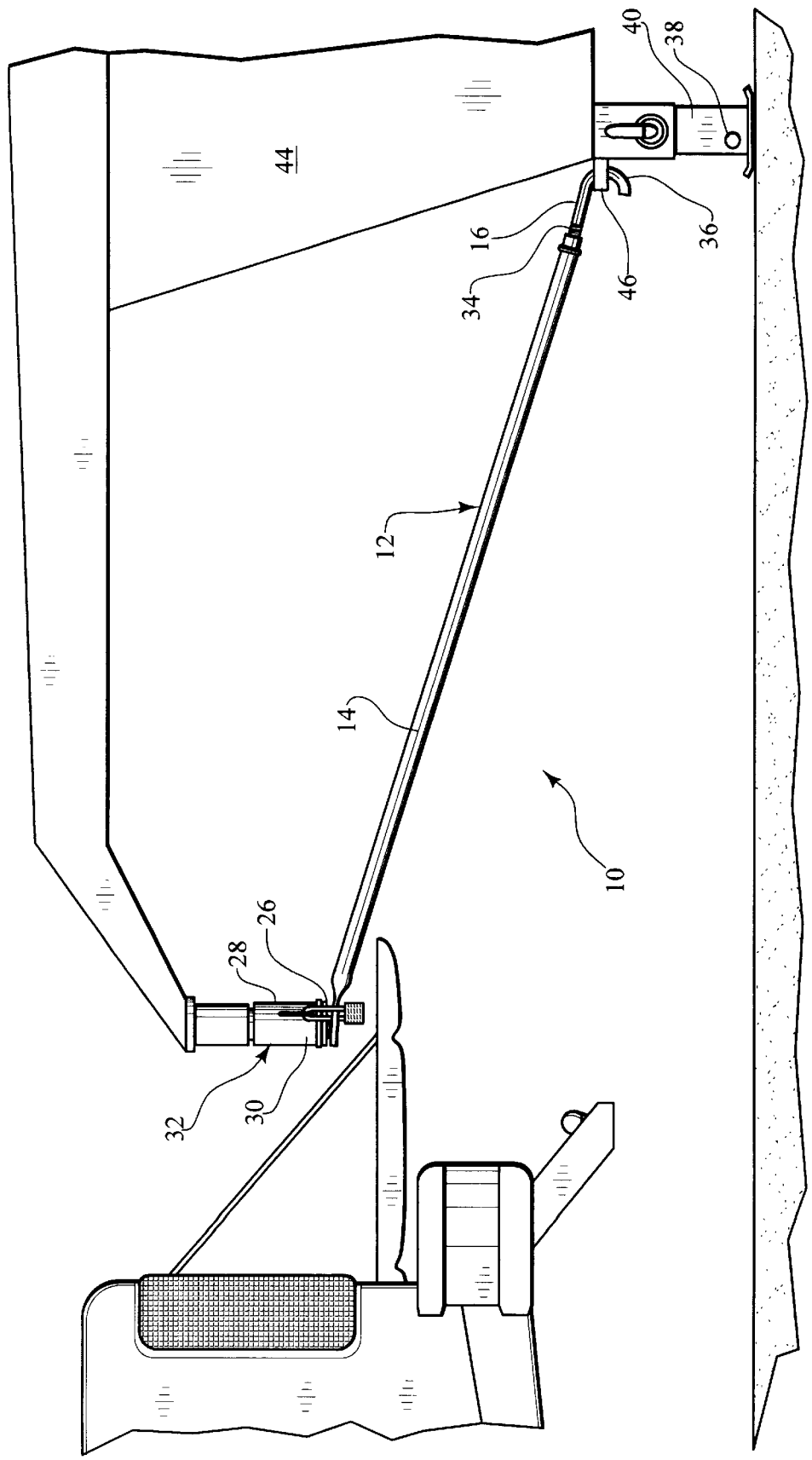
FIG. 4 is a perspective view of the present invention showing the a gooseneck trailer jack stand locking assembly having an extendable longitudinal locking brace extending from the gooseneck trailer coupling post hitch ball to a plate attached to the underside of the trailer preventing positioning or hitching of a vehicle thereto including a lock to prevent removal of the brace from the coupling post hitch ball.

The preferred embodiment includes leveling jack 42 having a drop leg 40 having at least one hole 38 and usually a plurality of holes 38 extending therethrough formed in the drop leg 40 of the leveling jack 42 of the trailer 44. Alternatively with a hole formed in a plate 46 attached to the underside or extending outwardly from the trailer 44. Moreover, a loop 48 may be attached to any part of the lower body of the trailer jack stand, or frame beneath the gooseneck 50 for cooperatively engaging the hook 36 of the extendable locking brace 12 in order that a truck or other towing vehicle cannot be backed in under the trailer 44 as shown in FIG. 4.

Rotation of the first longitudinal member 14 with respect to the second longitudinal member 16 extends the length of the longitudinal locking brace 12. A lock nut 33 having a hex shaped outer diameter portion for cooperative engagement with a wrench or other tool for aiding rotation thereof around the threaded shaft 34 for abutting and biasing the locking nut 33 into position against the distal end 32 of the first longitudinal member 14.

Upon inserting the hook 36 into the drop leg hole 40 or trailer plate hole 46, extending the longitudinal locking brace 12 to the desired length and alignment of the flat plate hole 25 in the plate 24 of the first longitudinal member 14 with the hole or means of attachment 28 of the coupling post 32, insertion and locking of a padlock 26 prevents removal of the longitudinal locking brace 12 and prevents positioning or hitching of a vehicle thereto.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A trailer and jack stand locking assembly comprising:
   a padlock comprising a shackle and a lock body;
   a gooseneck trailer having a trailer hitch ball receiving coupling post including means for cooperatively engaging said shackle of said padlock, and at least one trailer jack stand having at least one hole formed in the drop leg thereof;
   an extendable longitudinal locking brace comprising:
   a) a first longitudinal member having a first distal end including a hitch ball and means for locking comprising a plate attaching to said first distal end in close proximity to said hitch ball, said plate having at least one opening for cooperatively engaging said shackle of said padlock, and a second distal end having an axially threaded bore extending inwardly; and
   b) a second longitudinal member having a first distal end defining an axially threaded shaft for threadably engaging said axially threaded bore of said first longitudinal member, said opposing distal end of said second longitudinal member including a hook for cooperatively engaging at least one hole formed in the drop leg of the trailer lack stand; and
   means for securing said first longitudinal member to said second longitudinal member comprising a lock nut threadably engaging said axially threaded shaft for abutting against the second distal end of said first longitudinal member holding said axially threaded shaft securely to said first longitudinal member at a selected position.

2. The trailer and jack stand locking assembly of claim 1, wherein said hook is welded, bolted or integrally formed as a part of said second distal end of said second longitudinal member.

3. The trailer and jack stand locking assembly of claim 1, wherein said hook includes a straight section extending normal from said shaft and an angled section extending back toward and spaced apart from said shaft.

4. The trailer and jack stand locking assembly of claim 1, wherein said hook includes a straight section extending normal from said shaft and a curved section extending back toward and spaced apart from said shaft.

5. The trailer and jack stand locking assembly of claim 1, wherein said hook defines a continuous curve extending normal from said shaft back toward and spaced apart from said shaft.

6. The trailer and jack stand locking assembly of claim 1, wherein said hook includes a hole therein for inserting means for locking therethrough.

7. The trailer and jack stand locking assembly of claim 6, wherein said means for locking is a shackle of a padlock.

8. The trailer and jack stand locking assembly of claim 1, wherein said means for cooperatively engaging said shackle of said padlock is a loop extending from the coupling post of said trailer.

9. The trailer and jack stand locking assembly of claim 1, wherein said means for cooperatively engaging said shackle of said padlock is a hole formed in said coupling post.

10. A trailer and jack stand locking assembly, comprising:
- a gooseneck trailer having a trailer hitch ball receiving coupling post including means for cooperatively engaging a lock;
- a padlock comprising a shackle and a lock body;
- an extendable longitudinal locking brace comprising:
  - a) a first longitudinal member having a first distal end including a hitch ball and means for locking comprising a plate attaching to said first distal end in close proximity to said hitch ball, said plate having at least one opening for cooperatively engaging said shackle of said padlock, and said first longitudinal member having a second distal end including an axially threaded bore extending inwardly; and
  - b) a second longitudinal member having a first distal end defining an axially threaded shaft for threadably engaging said axially threaded bore of said first longitudinal member, said opposing distal end of said second longitudinal member including a hook for cooperatively engaging a means for holding extending from the frame of the trailer or said jack stand; and
- means for securing said first longitudinal member to said second longitudinal member comprising a lock nut threadably engaging said axially threaded shaft for abutting against the second distal end of said first longitudinal member holding said axially threaded shaft securely to said first longitudinal member at a selected position.

11. The trailer and jack stand locking assembly of claim 10, wherein said means for cooperatively engaging said shackle of said padlock is a loop extending from the coupling post of said trailer.

12. The trailer and jack stand locking assembly of claim 10, wherein said means for cooperatively engaging said shackle of said padlock is a hole formed in said coupling post.

13. The trailer jack stand locking assembly of claim 10, wherein said hook is welded, bolted or integrally formed as a part of said second distal end of said second longitudinal member.

14. The trailer jack stand locking assembly of claim 10, wherein said means for holding extending from the frame of said trailer for attaching said hook to said trailer beneath said gooseneck is a plate having a hole therein attached to the frame of said trailer for cooperative engagement with said hook.

15. The trailer jack stand locking assembly of claim 10, wherein said means for holding extending from the frame of said trailer for attaching said hook to said trailer beneath said gooseneck is a loop attached to the frame of said trailer or said jack stand for cooperative engagement with said hook.

16. The trailer jack stand locking assembly of claim 10, wherein said hook includes a straight section extending normal from said shaft and an angled section extending back toward and spaced apart from said shaft.

17. The trailer jack stand locking assembly of claim 10, wherein said hook includes a straight section extending normal from said shaft and a curved section extending back toward and spaced apart from said shaft.

18. The trailer jack stand locking assembly of claim 10, wherein said hook defines a continuous curve extending normal from said shaft back toward and spaced apart from said shaft.

19. The trailer jack stand locking assembly of claim 11, wherein said hook includes a hole therein for inserting means for locking therethrough.

20. The trailer jack stand locking assembly of claim 12, wherein said means for locking is a shackle of a padlock.

* * * * *